US011418400B2

(12) United States Patent
Kim

(10) Patent No.: US 11,418,400 B2
(45) Date of Patent: Aug. 16, 2022

(54) METHOD AND APPARATUS FOR CONFIGURING CLUSTER IN WIRELESS COMMUNICATION SYSTEM

(71) Applicant: Electronics and Telecommunications Research Institute, Daejeon (KR)

(72) Inventor: Dae Ho Kim, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 137 days.

(21) Appl. No.: 17/034,798

(22) Filed: Sep. 28, 2020

(65) Prior Publication Data

US 2021/0152427 A1    May 20, 2021

(30) Foreign Application Priority Data

Nov. 18, 2019   (KR) .......................... 10-2019-0147984

(51) Int. Cl.
*H04L 41/0893*    (2022.01)
*H04B 17/318*    (2015.01)
(Continued)

(52) U.S. Cl.
CPC ............ *H04L 41/0893* (2013.01); *G06F 1/28* (2013.01); *G16Y 10/75* (2020.01); *H04B 17/318* (2015.01);
(Continued)

(58) Field of Classification Search
CPC . H04L 41/0893; H04L 41/0803; H04L 67/12; H04L 43/08; G06F 1/28;
(Continued)

(56) References Cited

U.S. PATENT DOCUMENTS 9,672,346 B2     6/2017  Jarvis et al.
11,019,183 B2 *  5/2021  Alam ................. H04L 12/5692
(Continued)

FOREIGN PATENT DOCUMENTS

KR   10-2010-0127058    12/2010
KR   10-1129562          3/2012

OTHER PUBLICATIONS

Kyuhyung Kim et al., "Agriculture Sensor-Cloud Infrastructure and Routing Protocol in the Physical Sensor Network Layer", International Journal of Distributed Sensor Networks, Mar. 9, 2014, vol. 2014, 12 pages.

(Continued)

*Primary Examiner* — Hassan Kizou
*Assistant Examiner* — Abdullahi Ahmed
(74) *Attorney, Agent, or Firm* — Kile Park Reed & Houtteman PLLC

(57)    ABSTRACT

A method for configuring a cluster may comprise selecting cluster members from among a plurality of communication nodes; identifying radio signal strength deviations between the cluster members; generating sensor groups by classifying the cluster members according to sensor types; selecting a head candidate group and a sensor candidate group of each of the sensor groups based on the radio signal strength deviations; selecting a cluster head in the head candidate group; selecting operating sensor nodes in the sensor candidate group; and configuring one among the operating sensor nodes as a virtual device, wherein the virtual device operates to transmit information obtained from the operating sensor nodes to the cluster head.

16 Claims, 5 Drawing Sheets

(51) Int. Cl.
  *G16Y 10/75* (2020.01)
  *H04L 67/12* (2022.01)
  *H04Q 9/00* (2006.01)
  *G06F 1/28* (2006.01)
  *H04L 41/0803* (2022.01)

(52) U.S. Cl.
  CPC .......... *H04L 41/0803* (2013.01); *H04L 67/12* (2013.01); *H04Q 9/00* (2013.01); *H04Q 2209/40* (2013.01)

(58) Field of Classification Search
  CPC ........ G16Y 10/75; H04B 17/318; H04Q 9/00; H04Q 2209/40; H04W 52/0203; H04W 4/38; H04W 4/70; H04W 40/32; H04W 40/10; H04W 40/12; H04W 84/20; Y02D 30/70
  See application file for complete search history.

(56) References Cited

U.S. PATENT DOCUMENTS

| | | |
|---|---|---|
| 2007/0019569 A1 | 1/2007 | Park et al. |
| 2008/0188230 A1 | 8/2008 | Jeon et al. |
| 2008/0191868 A1 | 8/2008 | Lee et al. |
| 2009/0092112 A1 | 4/2009 | Kim et al. |
| 2011/0130162 A1 | 6/2011 | Park et al. |
| 2013/0128786 A1* | 5/2013 | Sultan ............... H04W 52/0238 370/311 |
| 2016/0295435 A1* | 10/2016 | Baroudi .................. H04W 4/70 |
| 2017/0094592 A1* | 3/2017 | Tabatabaei ............. G06N 20/10 |
| 2018/0198680 A1* | 7/2018 | Mladin ............... H04L 41/0816 |
| 2018/0279356 A1 | 9/2018 | Feng |
| 2019/0098578 A1* | 3/2019 | Baroudi .................. H04W 4/38 |
| 2019/0165961 A1* | 5/2019 | Bartier .................. H04L 12/184 |
| 2020/0382992 A1* | 12/2020 | Shilov ................... H04W 28/16 |
| 2022/0078885 A1* | 3/2022 | Gaillet .................... H04W 4/06 |

OTHER PUBLICATIONS

Geon Yong Park et al. "A Novel Cluster Head Selection Method based on K-Means Algorithm for Energy Efficient Wireless Sensor Network", 2013 27th International Conference on Advanced Information Networking and Applications Workshops, 2013, pp. 910-915.

* cited by examiner

METHOD AND APPARATUS FOR CONFIGURING CLUSTER IN WIRELESS COMMUNICATION SYSTEM

CROSS-REFERENCE TO RELATED APPLICATIONS

This application claims priority to Korean Patent Application No. 10-2019-0147984 filed on Nov. 18, 2019 with the Korean Intellectual Property Office (KIPO), the entire contents of which are hereby incorporated by reference.

BACKGROUND

1. Technical Field

The present disclosure relates to a method and an apparatus for configuring a cluster in a wireless communication system, and more specifically, to a method and an apparatus for configuring a cluster capable of long-term low-power operations by grouping a plurality of communication nodes to generate a virtual device.

2. Related Art

Internet of things (IoT) technology connects various things through the Internet, enables connected things to exchange information with each other, and provides a service that allows users to search for information about the things or to remotely control the things. The things connected through the Internet may be things that exist in the real world (e.g., temperature sensors, humidity sensors, lights, smartphones, or the like), or virtual things that exist in the Internet (e.g., SMS service, user recognition service, advertisement service, or the like). In particular, a service for inquiring information of the things or controlling the things using a conventional world wide web (WWW) technology is called a web-based IoT service or a web of things (WoT) service.

A communication system supporting IoT (hereinafter, IoT communication system) may provide various user services using information and functionality of connected devices. The IoT communication system may be connected to various things through the Internet. The IoT communication systems may be a wireless communication system based on a wireless personal access network (WPAN), wireless body area network (WBAN), wireless broadband internet (Wi-Bro), long range wide-area Network (LoRaWAN), world interoperability for microwave access (WiMax), wireless fidelity (Wi-Fi), or the like.

Remote monitoring and remote control using a wireless sensor network (WSN) are being considered as one of representative application fields of the IoT technology. The WSN may be implemented in a manner in which resources such as memory and CPU are limited in order to increase efficiency. In the WSN, sensor nodes may be randomly installed on a large scale in a large area. Meanwhile, when devices are installed on a large scale, packet losses may occur due to limited resources and interference with neighboring nodes. In addition, unnecessary power and communication resource consumption may occur due to redundant sensing between sensors. Further, a power available to each device may be limited, and thus, a technique for extending the life of individual devices or the entire network may be required.

SUMMARY

In order to solve the above-identified problems, exemplary embodiments of the present disclosure are directed to providing a method and an apparatus for configuring a cluster capable of long-term low-power operations by creating a virtual device through distributed cooperation between nodes.

According to an exemplary embodiment of the present disclosure for achieving the above-described objective, a method for configuring a cluster, performed by a cluster configuration apparatus in a communication system, may comprise selecting cluster members from among a plurality of communication nodes; identifying radio signal strength deviations between the cluster members; generating sensor groups by classifying the cluster members according to sensor types; selecting a head candidate group and a sensor candidate group of each of the sensor groups based on the radio signal strength deviations; selecting a cluster head in the head candidate group; selecting operating sensor nodes in the sensor candidate group; and configuring one among the operating sensor nodes as a virtual device, wherein the virtual device operates to transmit information obtained from the operating sensor nodes to the cluster head.

In the selecting of the cluster head, one cluster member in a head candidate group of a sensor group having a largest number of cluster members among the sensor groups may be selected as the cluster head.

In the selecting of the cluster head, a cluster member having a smallest radio signal strength deviation in the head candidate group of the sensor group having the largest number of cluster members among the sensor groups may be selected as the cluster head.

In the selecting of the head candidate group and the sensor candidate group of each of the sensor groups, a number of cluster members of a sensor group having a fewest cluster members among the sensor groups may be set as a first reference number, cluster members as many as the first reference number in an order of a large radio signal strength deviation may be selected as the sensor candidate group for each sensor group, and other cluster members may be selected as the head candidate group for each sensor group.

In the selecting of the operating sensor nodes in the sensor candidate group, a cluster member having a closest distance to the cluster head among cluster members of the sensor candidate group of each of the sensor groups may be selected as an operating sensor node, and other cluster members may be selected as standby sensor nodes.

The method may further comprise identifying a remaining power amount of the cluster head; and when the remaining power amount of the cluster head is less than a first threshold, changing one cluster member in a head candidate group of a sensor group having a lowest power usage rate among the sensor groups to the cluster head.

In the changing of one cluster member to the cluster head, a cluster member having a smallest radio signal strength deviation in the head candidate group of the sensor group having the lowest power usage rate may be changed to the cluster head.

The method may further comprise identifying remaining power amounts of the operating sensor nodes; and when an operating sensor node having a remaining power amount less than a second threshold is identified, a standby sensor node closest to the cluster head in a sensor candidate group of a sensor group to which the operating sensor node having the remaining power amount less than the second threshold belongs is changed to the operating sensor node.

The method may further comprise, when the cluster head is changed, changing cluster members closest to the changed cluster head within the sensor candidate group of each of the sensor groups to the operating sensor nodes.

According to an exemplary embodiment of the present disclosure for achieving the above-described objective, a cluster configuration apparatus for configuring a cluster in a communication system may comprise a processor; and a memory storing at least one instruction executable by the processor, wherein when executed by the processor, the at least one instruction causes the processor to: select cluster members from among a plurality of communication nodes; identify radio signal strength deviations between the cluster members; generate sensor groups by classifying the cluster members according to sensor types; select a head candidate group and a sensor candidate group of each of the sensor groups based on the radio signal strength deviations; select a cluster head in the head candidate group; select operating sensor nodes in the sensor candidate group; and configure one among the operating sensor nodes as a virtual device, wherein the virtual device operates to transmit information obtained from the operating sensor nodes to the cluster head.

The at least one instruction may further cause the processor to select a cluster member having a smallest radio signal strength deviation in a head candidate group of a sensor group having a largest number of cluster members among the sensor groups as the cluster head.

The at least one instruction may further cause the processor to set a number of cluster members of a sensor group having a fewest cluster members among the sensor groups as a first reference number, select cluster members as many as the first reference number in an order of a large radio signal strength deviation as the sensor candidate group for each sensor group, and select other cluster members as the head candidate group for each sensor group.

The at least one instruction may further cause the processor to select a cluster member having a closest distance to the cluster head among cluster members of the sensor candidate group of each of the sensor groups as an operating sensor node, and select other cluster members as standby sensor nodes.

The at least one instruction may further cause the processor to identify a remaining power amount of the cluster head; and change one cluster member in a head candidate group of a sensor group having a lowest power usage rate among the sensor groups to the cluster head, when the remaining power amount of the cluster head is less than a first threshold.

The at least one instruction may further cause the processor to identify remaining power amounts of the operating sensor nodes; and change a standby sensor node closest to the cluster head in a sensor candidate group of a sensor group to which an operating sensor node having a remaining power amount less than a second threshold belongs to the operating sensor node, when the operating sensor node having the remaining power amount less than the second threshold is identified.

The at least one instruction may further cause the processor to, when the cluster head is changed, change cluster members closest to the changed cluster head within the sensor candidate group of each of the sensor groups to the operating sensor nodes.

According to exemplary embodiments of the present disclosure, only one sensor node for each sensor type among communication nodes constituting a cluster can perform a measurement operation, and data measured from a plurality of sensor nodes can be collected into a single virtual device, and transmitted to a cluster head. Through this, it is possible to prevent waste of power and communication resources due to unnecessary redundant measurements and data transmissions performed by the sensor nodes. In addition, according to the exemplary embodiments of the present disclosure, it can be monitored whether the cluster head or an operating sensor node has a sufficient power, and when the cluster head or operating sensor node has insufficient power, another communication node can become a new cluster head or operating sensor node. Through this, the stability of the sensor management operation can be improved and the lifetime of the entire cluster can be improved.

DETAILED DESCRIPTION OF THE EMBODIMENTS

Figure 1:
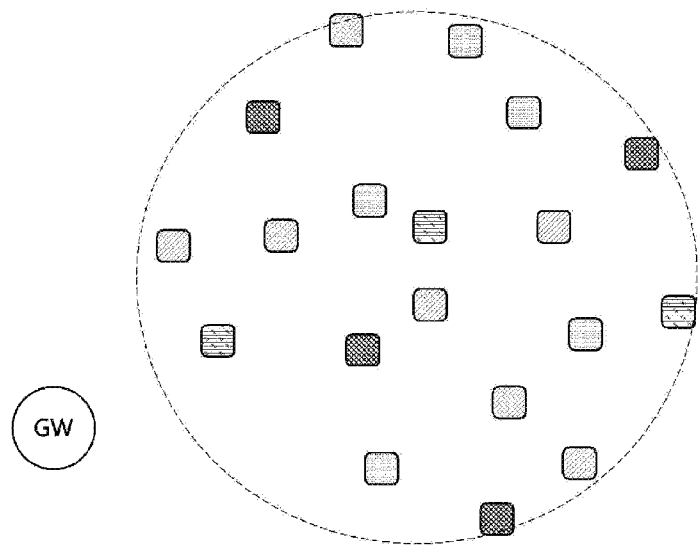
FIG. 1 is a conceptual diagram illustrating an exemplary embodiment of a communication system including a cluster.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating an exemplary embodiment of a communication system including a cluster.

Referring to FIG. 1, a communication system may include a gateway (GW) and a plurality of communication nodes. The gateway may refer to an access point, radio access station, Node B, evolved Node B (eNB), base transceiver station, mobile multi-hop relay (MMR)-BS, coordinator, or the like, and may include all or part of functions of the base station, access point, radio access station, NodeB, eNB, base transceiver station, MMR-BS, and coordinator.

Each of the communication nodes may refer to a mobile station, mobile terminal, subscriber station, portable subscriber station, user equipment, access terminal, end-device, or the like, and may include all or part of functions of the terminal, mobile station, mobile terminal, subscriber station, mobile subscriber station, user device, and access terminal. Particularly, the communication nodes may include sensors attached to things and capable of communicating. The sensors attached to the things can be used to implement the Internet of Things (IoT).

Each of the communication nodes may be a desktop computer, laptop computer, tablet PC, wireless phone, mobile phone, smart phone, smart watch, smart glass, e-book reader, portable multimedia player (PMP), portable gaming machine, navigation device, digital camera, digital multimedia broadcasting (DMB) player, digital audio recorder, digital audio player, digital picture recorder, digital picture player, digital video recorder, digital video player, or the like. Each of the plurality of communication nodes may have the following structure.

Figure 2:
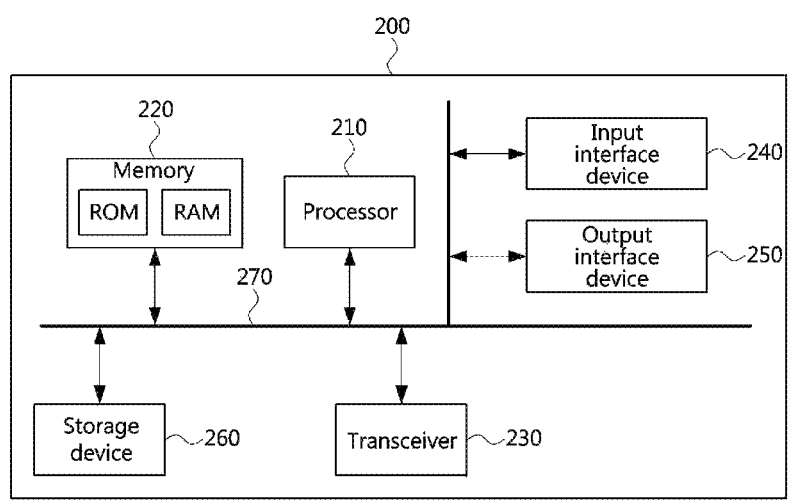
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270. However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring back to FIG. 1, the communication system may include a gateway (GW) and a plurality of communication nodes. Communications between the gateway and the communication nodes may be performed by a full-duplex scheme. In the case of the full-duplex scheme, communication speed can be improved because each of the gateway and terminals can simultaneously transmit and receive data in both directions.

The plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, an orthogonal frequency division multiple access (OFDMA) based communication protocol, single carrier (SC)-FDMA based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

The communication system may be a WPAN-based wireless communication system. However, exemplary embodiments are not limited thereto. For example, the communication system may include a wireless communication system based on a wireless body area network (WBAN), wireless broadband internet (WiBro), long range wide-area network (LoRaWan), world interoperability for microwave access (WiMax), Sigfox, wireless fidelity (Wi-Fi), or the like. Alternatively, the communication system may be a wireless communication system based on a Bluetooth low energy (BLE), ZigBee, Z-Wave, near field communication (NFC), radio frequency identification (RFID), or the like.

Hereinafter, NB-IoT communication technologies will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

In the early days, IoT communications mainly started with sensor and radio frequency identification (RFID) networks targeting a local area. However, as the purpose and characteristics of applications are gradually diversified, they are being implemented through various wired/wireless networks. In particular, in considerations of services for mobile IoT devices, service support in a wide range of areas including islands, mountains, and oceans, cost restrictions during network deployment and operation, ease of network maintenance, security for reliable data transmission, service quality assurance, and the like, there is a growing need for developing an IoT communication system based on a conventionally constructed mobile communication network.

The IoT communication system has characteristics different from the conventional human-user-centered mobile communication system. For example, an IoT device (also referred to as a 'terminal') may transmit and receive very small data intermittently (or, at a short periodicity if necessary), and it may not be easy to supply power, so it may be necessary to support ultra-low power operations. In addition, depending on the IoT device, support for mobility may be required, or it may be used as fixedly attached to a specific place.

The IoT device may require mobility support or may be used fixedly depending on a situation. In addition, numerous IoT devices may be connected to the IoT communication network at the same time. Typical examples of the IoT devices have been considered in form of smart meters and vending machines with mobile communication modules. Recently, they has been considered as a form of automatically connecting to a network and performing communication according to an installed location and use environment without a user's manipulation or intervention.

Due to these characteristics, research on the deployment of IoT communication networks using conventional mobile communication systems is active, and in particular, narrow band (NB)-IoT, the IoT communication system using the 3GPP LTE communication system, which is the most worldwide applied mobile communication system, attracts much attention.

The NB-IoT supports three operation modes: in-band, guard band, and stand-alone, and the same requirements are applied to these. The NB-IoT in the in-band mode may be operated by allocating some of resources within an LTE band to the NB-IoT. The NB-IoT in the guard band mode may utilize a guard frequency band of the LTE system, and carriers of the NB-IoT may be placed as close as possible to edge subcarriers of the LTE system. The stand-alone mode NB-IoT may be operated by separately allocating some carriers within a global system for mobile communications (GSM) band.

One of communication nodes constituting a cluster of the communication system may be a cluster head (CH), and other communication nodes may be cluster members. The cluster head may be connected to the gateway and the cluster members.

In a wireless communication network to which a large number of devices are connected, a transmission path selection algorithm may be used to avoid a hot spot where traffic is concentrated, or a cluster may be configured to prevent a large number of wireless communication connections from being concentrated to the gateway (or sink node). In a cluster-based routing protocol, sensor nodes in the network are grouped to form several clusters, each cluster maintains one cluster head (CH) that can communicate with the gateway (or sink node), and the remaining sensor nodes may become cluster members (CM) and form a hierarchical network structure. Here, since the cluster head serves to collect sensing data from a plurality of cluster members connected to it and transmit the collected data to the gateway (or sink node), energy may be quickly exhausted. Therefore, the CH election and management method may be a very important challenge in the cluster-based routing protocol.

The reason for configuring the cluster may be to reduce the number of data transmissions and cope with the limitation of communication resources by concentrating sensing data on one cluster head capable of communicating with the gateway (or sink node). However, in a service that randomly distributes a large number of devices, multiple sensor nodes may unnecessarily operate redundantly in the cluster. That is, unnecessary redundant sensing data may be transmitted to the infrastructure through the cluster head, thereby causing unnecessary power loss and waste of communication resources.

In order to solve the above-described problems, the present disclosure is directed providing a method and an apparatus for configuring a cluster capable of low-power long-time operations by configuring a virtual device using distributed cooperation between communication nodes. Exemplary embodiments of such the cluster configuration method and apparatus will be described with reference to FIGS. 3 to 7.

Figure 3:
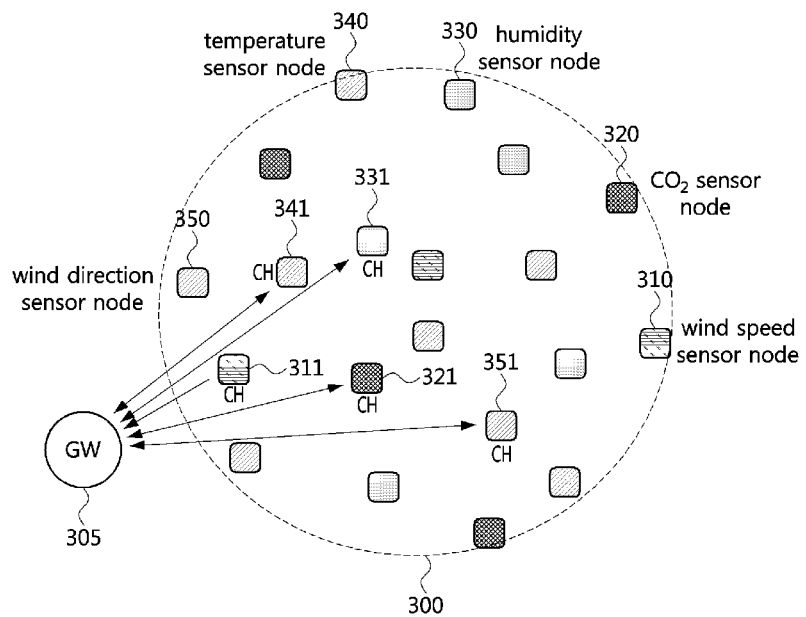
FIG. 3 is a conceptual diagram illustrating an exemplary embodiment of a communication system including a cluster according to the present disclosure.

FIG. 3 is a conceptual diagram illustrating an exemplary embodiment of a communication system including a cluster according to the present disclosure.

Referring to FIG. 3, communication nodes of a communication system may be sensor nodes constituting a wireless sensor network (WSN). For example, the communication nodes of the communication system may be micro IoT sensor devices. The wireless network service including these communication nodes may be implemented in a manner in which sensor nodes are randomly distributed over a large area. For example, the wireless network service may be implemented in the manner of randomly distributing sensors required for forest fire detection in areas where it is difficult to access by using drones for forest fire prevention and response.

The communication nodes of the communication system may form one cluster 300 by a cluster configuration apparatus (not shown). Each of the communication nodes may be directly connected to a gateway 305 or a sink node serving as a gateway, or may be connected to the gateway or sink node through another communication node. In the exemplary embodiments of the present disclosure, descriptions on the gateway may be applied to a sink node unless otherwise indicated.

The communication nodes of the communication system may be various types of sensor nodes. For example, the communication nodes of the communication system may include a wind speed sensor node 310, $CO_2$ sensor node 320, humidity sensor node 330, temperature sensor node 340, wind direction sensor node 350, and/or the like. They may include various sensor nodes in addition thereto. Such the sensor nodes can be distributed and operated for forest fire services such as forest fire prediction, forest fire progress direction detection, and residual fire detection in environments such as mountains where human access is difficult, and can be operated in various other situations.

One of the communication nodes constituting the cluster 300 of the communication system may be a cluster head (CH), and other communication nodes may be cluster members. The cluster head CH may be connected to the gateway and the cluster members. The cluster head CH may be a sensor node selected from any one of several sensor types. The cluster head CH selected as described above may be a wind speed sensor node 311, a $CO_2$ sensor node 321, a humidity sensor node 331, a temperature sensor node 341, a wind direction sensor node 351, or the like.

Figure 4:
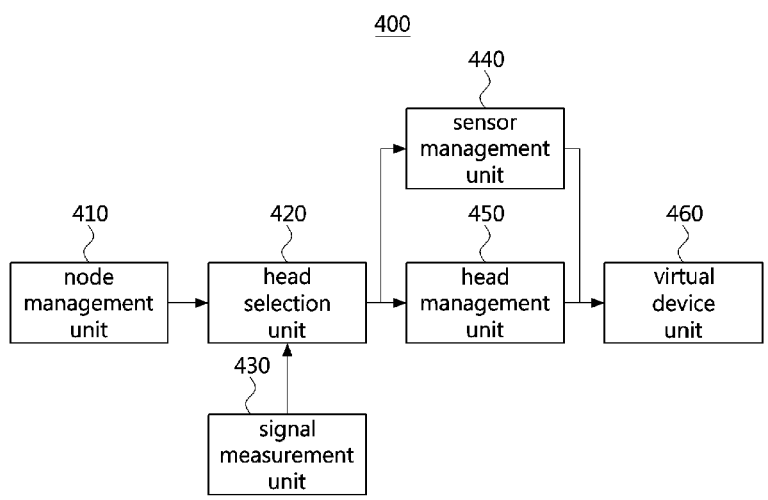
FIG. 4 is a block diagram illustrating an exemplary embodiment of an apparatus for configuring a cluster according to the present disclosure.

FIG. 4 is a block diagram illustrating an exemplary embodiment of an apparatus for configuring a cluster according to the present disclosure.

Referring to FIG. 4, a cluster configuration apparatus 400 may include a node management unit 410, a head selection unit 420, a signal measurement unit 430, a sensor management unit 440, a head management unit 450, and a virtual device unit 460. Each logical component included in the cluster configuration apparatus 400 may be implemented with at least one instruction stored in a memory of the cluster configuration apparatus 400. The at least one instructions stored in the memory of the cluster configuration apparatus 400 may be executed by a processor of the cluster configuration apparatus 400.

The node management unit 410 may manage the communication nodes included in the cluster 300 of the communication system. Specifically, among the communication nodes of the communication system, the communication nodes to be included in the cluster 300 may be determined, and the communication nodes may be classified and counted by type.

The head selection unit 420 may classify the communication nodes included in the cluster 300 into a head candidate group, a sensor candidate group, or the like based on a predetermined criterion. The operation of the head selection unit 420 may be performed based on data received from the node management unit 410 and/or the signal measurement unit 430.

The signal measurement unit 430 may measure strengths or sensitivities of radio signals between the communication nodes included in the cluster 300, and calculate radio signal strength deviations.

The sensor management unit 440 may manage the communication nodes selected as the sensor candidate group by the head selection unit 420. For example, the sensor management unit 440 may select operating sensor nodes to perform sensor functions and standby sensor nodes to be in a standby mode from among the communication nodes included in the sensor candidate group. In addition, when a remaining power amount of a communication node selected as an operating sensor node is lowered to a certain amount or less, the sensor management unit 440 may change another communication node included in the sensor candidate group to an operating sensor node that will perform a sensor function.

The head management unit 450 may manage the communication nodes selected as the head candidate group or the cluster head by the head selection unit 420. For example, when a remaining power amount of the communication node selected as the cluster head is lowered to a certain amount or less, the head management unit 450 may change one of the other communication nodes included in the head candidate group to a new cluster head.

The virtual device unit 460 may connect the operating sensor nodes and the gateway by creating one virtual device. Specifically, the virtual device unit 460 may create a single virtual device that collects data measured through a plurality of operating sensor nodes and transmits the collected data to the cluster head. The virtual device unit 460 may configure one of the operating sensor nodes as the virtual device.

Figure 5:
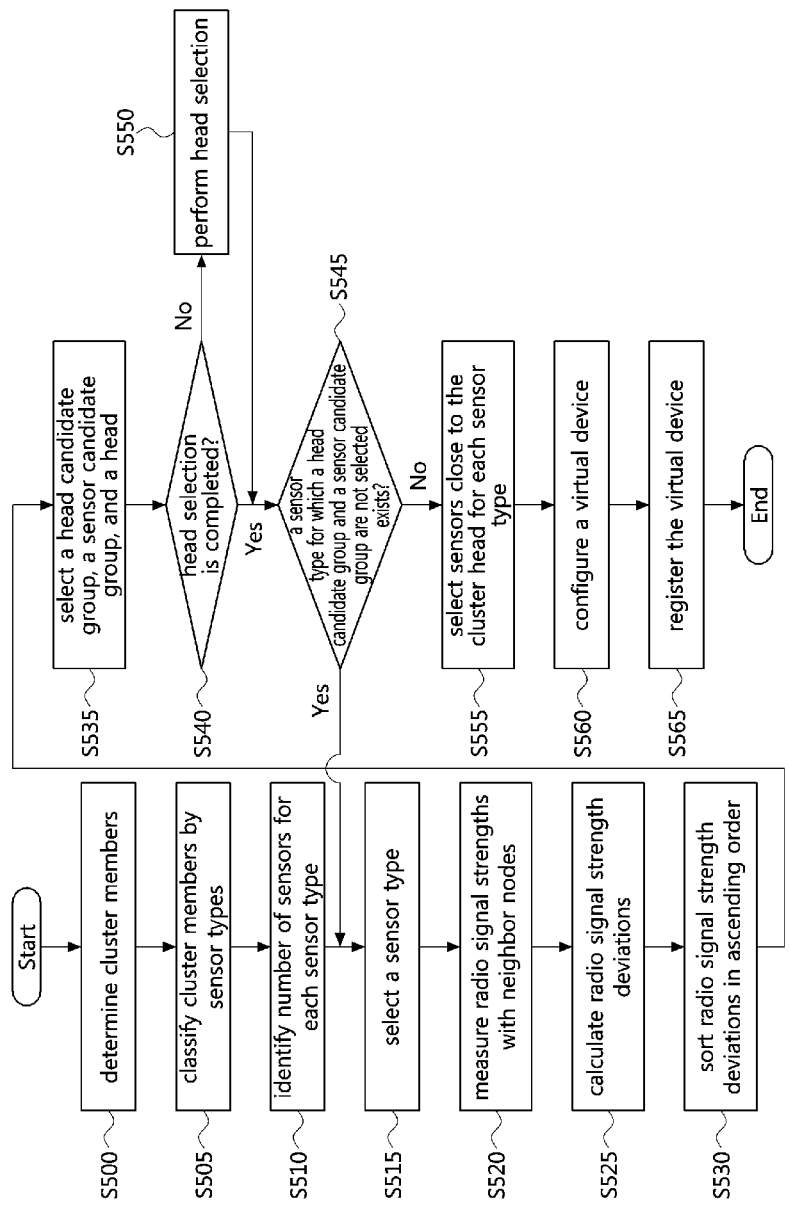
FIG. 5 is a flowchart showing an exemplary embodiment of a cluster configuration method according to the present disclosure.

FIG. 5 is a flowchart showing an exemplary embodiment of a cluster configuration method according to the present disclosure.

Referring to FIG. 5, the communication system may include the gateway 305 and the plurality of communication nodes shown in FIG. 3. In addition, the communication system may include the cluster configuration apparatus 400 shown in FIG. 4. The cluster configuration apparatus 400 may perform the following operations to manage the configuration of the cluster 300 including a plurality of communication nodes included in the communication system.

The node management unit 410 may configure the cluster 300 by determining nodes to be included in the cluster 300 among the communication nodes of the communication system (S500). For example, the node management unit 410 may configure one cluster 300 by collecting communication nodes distributed by one drone. Alternatively, the node management unit 410 may configure one cluster 300 by collecting communication nodes within a predetermined distance.

The node management unit 410 may classify the communication nodes included in the cluster 300 by types. Specifically, the node management unit 410 may generate sensor groups by classifying the communication nodes according to sensor types (S505). For example, the communication nodes may be IoT sensor nodes, and according to their respective functions, they may be classified into a wind speed sensor node 310, a $CO_2$ sensor node 320, a humidity sensor node 330, a temperature sensor node 340, a wind direction sensor node 350, or other various types of sensor nodes. Accordingly, the node management unit 410 may generate a wind speed sensor group, a $CO_2$ sensor group, a humidity sensor group, a temperature sensor group, a wind direction sensor group, or other various types of sensor groups.

The node manager 410 may identify the number of communication nodes in each of the sensor groups (S510). In addition, the node management unit 410 may identify a sensor group having the largest number of communication nodes (S515). In addition, the node manager 410 may identify the number of communication nodes in a sensor group having the fewest communication nodes, and configure this as a 'first reference number'.

The signal measurement unit 430 may identify information on radio signal strengths between communication nodes from the communication nodes constituting the cluster 300 (S520). To this end, each communication node may report information of strengths of radio signals received from other communication nodes to the signal measurement unit 430. The radio signal strength information may be a reference signal received power (RSRP), a reference signal received quality (RSRQ), a reference signal strength indicator (RSSI), or the like. The information of strengths of the radio signals received by each communication node from other communication nodes may be calculated individually or may be calculated as an average.

The signal measurement unit 430 may calculate a radio signal strength deviation based on the radio signal strength information of the respective communication nodes (S525). That is, the signal measurement unit 430 may calculate an average value of the radio signal strengths received from the respective communication nodes, and calculate differences between the average value and the respective radio signal strengths to calculate the radio signal strength deviation of each communication node.

Then, the signal measurement unit 430 may sort the calculated radio signal strength deviations in ascending order (S530). Here, as the radio signal strength deviation is smaller, it can be seen that the corresponding communication node is closer to the center of the cluster 300.

The head selection unit 420 may classify the communication nodes included in the cluster 300 into a head candidate group, a sensor candidate group, or a cluster head (CH), based on a predetermined criterion (S535). The operation of the head selection unit 420 may be performed based on data received from the node management unit 410 and/or the signal measurement unit 430.

For example, the head selection unit 420 may select as many communication nodes as the first reference number among communication nodes for each sensor group as a sensor candidate group (S535). More specifically, the head selection unit 420 may select as many communication nodes as the first reference number in an order of the large radio signal strength deviation among communication nodes for each sensor group as the sensor candidate group, based on the radio signal strength deviations sorted in ascending order by the signal measurement unit 430 (S535). The head selection unit 420 may select the remaining communication nodes not selected as the sensor candidate group as a head candidate group (S535).

The head selection unit 420 may select one communication node from among the communication nodes selected as the head candidate group as the cluster head (S535). Specifically, the head selection unit 420 may identify information on a sensor group having the largest number of communication nodes among several sensor groups from the node management unit 410, and select one communication node from a head candidate group of the corresponding sensor group as the cluster head. The head selection unit 420 may select, as the cluster head, the communication node having the smallest radio signal strength deviation among the communication nodes included in the head candidate group.

The communication nodes selected as the sensor candidate group, the head candidate group, and the cluster head by the head selection unit 420 may be managed by the sensor management unit 440 and the head management unit 450, respectively.

The head selection unit 420 may identify whether a cluster head of the cluster 300 is selected (S540), and when the cluster head is not selected, the head selection unit 420 may perform an operation of selecting the cluster head (S550). The operation of selecting the cluster head in the step S550 may be similar to the operation of selecting the cluster head in the step S535.

When the cluster head is selected in the step S540, the head selection unit 420 may identify whether there is a sensor group for which a head candidate group and a sensor candidate group are not selected (S545). When there is a sensor group for which a head candidate group and a sensor candidate group are not selected, the node management unit 410 may select a sensor group having the largest number of communication nodes among the remaining sensor groups (S515) to perform selection of a head candidate group and a sensor candidate group.

When there are no sensor groups for which a head candidate group and a sensor candidate group are not selected in the step S545, the sensor management unit 440 may select operating sensor nodes (SSSS). Specifically, the sensor management unit 440 may select, from among communication nodes included in the sensor candidate group for each sensor group, communication nodes having the closest distance to the cluster head as the operating sensor nodes (SSSS).

The virtual device unit 460 may group operating sensor nodes selected for each sensor group to configure one virtual device (S560) and register it in the communication system or infrastructure (S565). Specifically, the virtual device unit 460 may create a single virtual device that collects data measured through a plurality of operating sensor nodes and transmits it to the cluster head. The virtual device unit 460 may configure one of the operating sensor nodes as the virtual device.

As described above, the cluster configuration apparatus according to an exemplary embodiment of the present disclosure may classify the communication nodes constituting the cluster according to their functions, so that only one sensor node in each sensor group performs a measurement operation. Through this, it is possible to prevent waste of power and communication resources due to unnecessary redundant measurements performed by the sensor nodes.

Further, in the cluster configuration apparatus according to an exemplary embodiment of the present disclosure, a sensor node having a close distance to the cluster head represents each sensor group, thereby increasing communication efficiency between the cluster head and each operating sensor node.

In addition, the cluster configuration apparatus according to an exemplary embodiment of the present disclosure can efficiently manage transmission of sensing data by grouping operating sensor nodes performing the sensing to configure one virtual device.

In a service environment using a large number of sensor nodes, a connection scheme between the sensor node and the gateway (or sink node) may be important. As a low-power long-distance wireless communication technology develops, exemplary embodiments using a star network topology are increasing. Even in the low-power long-distance wireless communication technology, as a communication distance between communication nodes increases, energy consumption increases and the lifespan of the communication nodes may be shortened accordingly. In addition, in the situation where the communication nodes are distributed on a large scale, energy consumption may increase due to wireless communication interferences. In addition, in the service environment where sensor nodes are randomly distributed on a large scale, redundant sensing and redundant data transmission may occur, resulting in unnecessary consumption of power and communication resources. An exemplary embodiment of the present disclosure has an effect of effectively solving these problems, minimizing wireless communication energy consumption, and increasing the total service provision time for each cluster.

Figure 6:
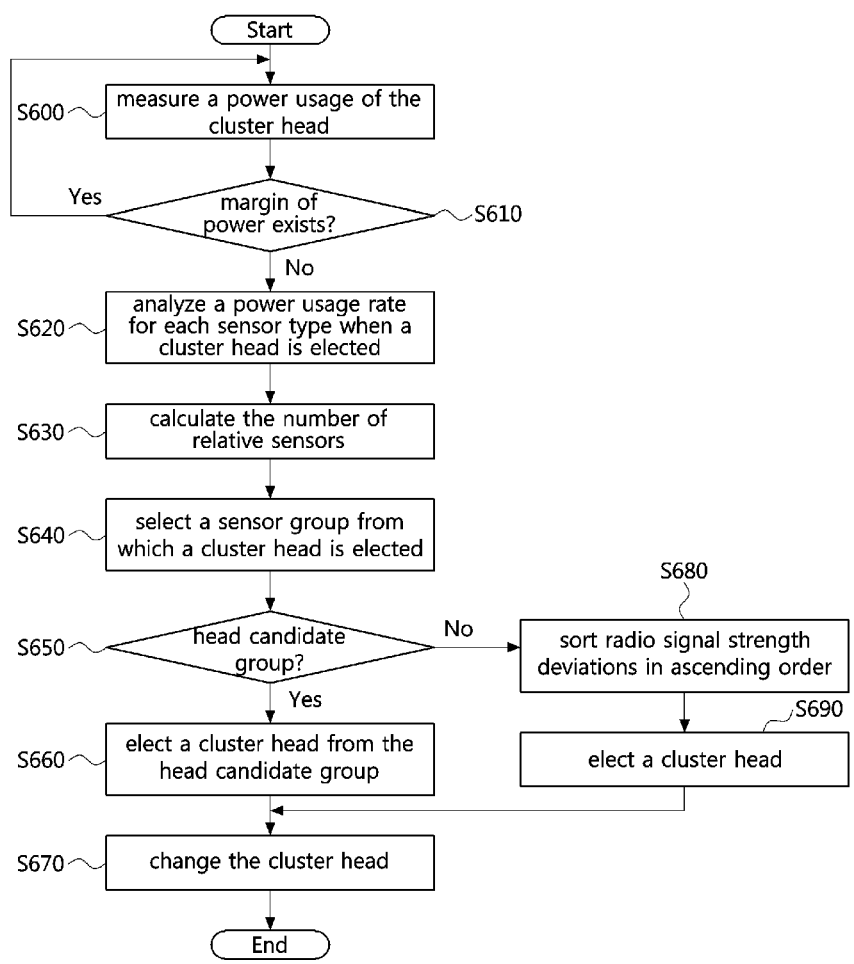
FIG. 6 is a flowchart illustrating an exemplary embodiment of a method for changing a cluster head according to the present disclosure.

FIG. 6 is a flowchart illustrating an exemplary embodiment of a method for changing a cluster head according to the present disclosure.

Referring to FIG. 6, the communication system may include the cluster 300 including a plurality of communication nodes and the gateway 305 shown in FIG. 5. In addition, the communication system may include the cluster configuration apparatus 400 shown in FIG. 4. The cluster configuration apparatus 400 may change the cluster head of the cluster 300 by performing the following operation.

The head management unit 450 of the cluster configuration apparatus 400 may identify a power usage or remaining power amount of the cluster head (S600). To this end, the cluster head may periodically report power usage or remaining power amount information to the head management unit 450. Alternatively, the head management unit 450 may transmit a confirmation request message to the cluster head, and the cluster head may return power usage or remaining power amount information as a response.

The head management unit 450 may compare the power usage or remaining power amount measured in the step S600 with a preconfigured reference value to determine whether there is a margin of the power in the cluster head (S610). In other words, the head management unit 450 may determine whether the current cluster head can be continuously used based on the power usage or remaining power amount of the cluster head.

For example, the head management unit 450 may compare the remaining power amount of the cluster head with a first threshold. When the remaining power amount of the cluster head is equal to or greater than the first threshold, the head management unit 450 may determine that there is a margin of the power in the cluster head. On the other hand, when the remaining power amount of the cluster head is less than the first threshold, the head management unit 450 may determine that there is no margin of the power in the cluster head.

The first threshold may be set to a value that a person of ordinary skill in the art considers appropriate for determining whether or not there is a margin of power in the operating sensor node. In determining whether the cluster head has a margin of power, the power usage required for the cluster head change operation below may be considered together. For example, the head management unit 450 may determine whether the remaining power amount of the cluster head is sufficient to perform a communication operation with each operating sensor node, a communication operation with the gateway, and a subsequent cluster head change operation (S610).

When there is no margin of power in the cluster head, the head management unit 450 may perform an operation for changing the cluster head to another communication node. In order to change the cluster head, the head management unit 450 may analyze an energy usage rate or a power usage rate $S_u$ for each sensor group. The power usage rate $S_u$ for each sensor group may be defined as in Equation 1.

$$S_u = \frac{d + \frac{u}{100}}{N} \times 100\% \qquad \text{[Equation 1]}$$

Here, d may mean the number of communication nodes that cannot communicate with other communication nodes or measure data due to power exhaustion among the communication nodes of the corresponding sensor group, u may mean a power usage rate (%) of the current operating sensor node, and N may be the number of all communication nodes excluding the communication node used as the cluster head. Information such as d, u, and N may be calculated based on information on a status of each communication node, which is received from the node management unit 410 or the sensor management unit 440.

That is, the power usage rate $S_u$ for each sensor group may be higher as the number d of communication nodes that cannot communicate with other communication nodes or measure data due to power exhaustion increases, the power u consumed by the current operating sensor node increases, or the number N of communication nodes for each sensor group decreases. As described above, the higher the power usage rate $S_u$ for each sensor group, the lower the margin or power for the entire sensor group.

In other words, the power usage rate $S_u$ for each sensor group may be lower as the number d of communication nodes that cannot communicate with other communication nodes or measure data due to power exhaustion decreases, the power u consumed by the current operating sensor node decreases, or the number N of communication nodes for each sensor group increases. As described above, the lower the power usage rate $S_u$ for each sensor group, the higher the margin of power for the entire sensor group.

The head management unit 450 may select a cluster head from a sensor group having a high margin or power among the plurality of sensor groups. When one communication node is selected as the cluster head, it can be seen that the number of nodes that can perform measurement as sensor nodes decreases by one in the corresponding sensor group. Therefore, it may be necessary to compensate for this in the calculation of the power usage rate.

That is, in the analysis of the power usage rate for each sensor group, it is possible to assume a situation in which the cluster head is elected. In this case, the power usage rate $S_h$ for each sensor group may be defined as in Equation 2.

$$S_h = \frac{d + \frac{u}{100}}{N - 1} \times 100\% \qquad \text{[Equation 2]}$$

As in Equation 1, d may mean the number of communication nodes discarded due to power exhaustion among the communication nodes of the corresponding sensor group, u may mean a power usage rate (%) of the current operating sensor node. In addition, N may be the number of all communication nodes except the communication node used as the cluster head. Here, assuming that one communication node is to be selected as a cluster head, the denominator may be determined as N−1.

It can be seen that the higher the margin of power in the entire sensor group is, the greater the number of spare sensor nodes in the sensor group is. That is, the lower the power usage rate $S_h$ for each sensor group, the greater the number of spare nodes in the sensor group. The number of virtual spare sensor nodes may be referred to as 'the number of relative sensors', and may be defined as a reciprocal of the power usage rate $S_h$ for each sensor group.

The head management unit 450 may calculate the power usage rate $S_h$ for each sensor group on the assumption that the cluster head is elected (S620), and calculate the reciprocal of the power usage rate $S_h$ to calculate the number of relative sensors (S630).

The head management unit 450 may select a sensor group having the largest number of relative sensors (S640). The head management unit 450 may elect a new cluster head from the corresponding sensor group selected as described above.

When a head candidate group is selected for the sensor group selected in the step S640 (S650), the head management unit 450 may elect a cluster head from the head candidate group (S660). Specifically, the head management unit 450 may elect, as the cluster head, a communication node having the lowest radio signal strength deviation in the head candidate group of the selected sensor group.

When a head candidate group is not selected in the sensor group selected in the step S640 or the head candidate group does not remain because all communication nodes of the existing head candidate group exhaust power (S650), the head management unit 450 may elect the cluster head among all communication nodes of the corresponding sensor group.

Specifically, the head management unit 450 may obtain information on radio signal strength deviations of all communication nodes of the corresponding sensor group through the signal measurement unit 430. The signal measurement unit 430 may select a communication node having the lowest radio signal strength deviation by sorting the radio signal strength deviations of the communication nodes in ascending order (S680). The head management unit 450 may elect the communication node selected through the signal measurement unit 430 as the cluster head (S690).

The head management unit 450 may change the communication node elected as a cluster head in the step S660 or the step S690 to a new cluster head, and change the existing cluster head to a general cluster member (S670).

As described above, the cluster configuration apparatus according to an exemplary embodiment of the present disclosure may monitor whether the cluster head has a margin of power, and when it is determined that the cluster head has no margin of power, the apparatus may change another communication node to the cluster head. Through this, the stability of the cluster head management operation can be improved and the lifetime of the entire cluster can be improved.

In addition, the cluster configuration apparatus according to an exemplary embodiment of the present disclosure can increase the stability of the operating sensor node change operation and the overall sensor management operation by taking into account the power usage required for the operating sensor node change operation in determining whether there is such a power margin.

In addition, the cluster configuration apparatus according to an exemplary embodiment of the present disclosure can more accurately determine the power margin of the entire sensor group by calculating the power usage rate and the number of relative sensors for each sensor group in selecting a sensor group from which the cluster head is to be extracted.

Figure 7:
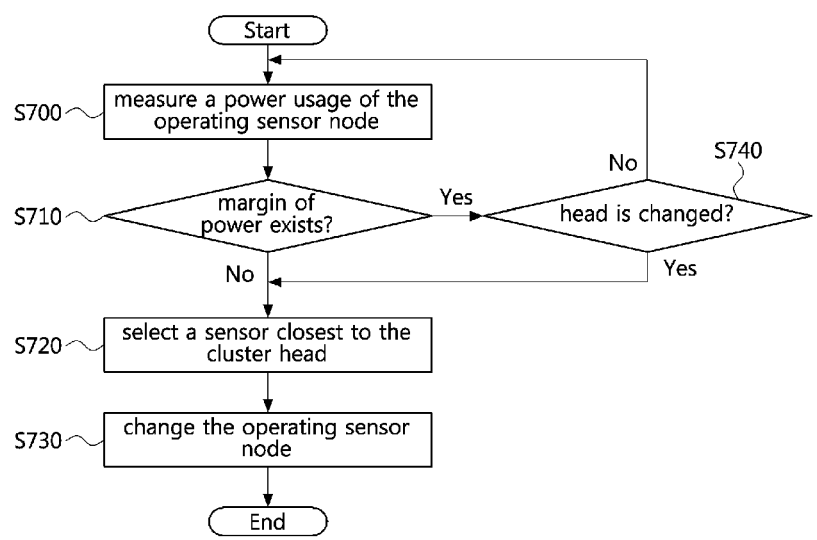
FIG. 7 is a flowchart illustrating an exemplary embodiment of a method of changing an operating sensor node according to the present disclosure.

FIG. 7 is a flowchart illustrating an exemplary embodiment of a method of changing an operating sensor node according to the present disclosure.

Referring to FIG. 7, the communication system may include the cluster 300 including a plurality of communication nodes and the gateway 305 shown in FIG. 3. In addition, the communication system may include the cluster configuration apparatus 400 shown in FIG. 4. The cluster configuration apparatus 400 may change the operating sensor node of the cluster 300 by performing the following operation.

The sensor management unit 440 of the cluster configuration apparatus 400 may identify a power usage or a remaining power of each operating sensor node (S700). To this end, each operating sensor node may periodically report power usage or remaining power amount information to the sensor management unit 440. Alternatively, the sensor management unit 440 may transmit a confirmation request message to each operating sensor node, and each operating sensor node may return power usage or remaining power amount information as a response.

The sensor management unit 440 may compare the power usage or remaining power measured in the step S700 with a preconfigured reference value, and determine whether there is a margin of power in each operating sensor node (S710). In other words, the sensor management unit 440 may determine whether current operating sensor nodes can be continuously used based on the power usages or remaining power amounts of the respective operating sensor nodes.

For example, the sensor management unit 440 may compare the remaining power amount of each operating sensor node with a second threshold. When the remaining power amount of each operating sensor node is greater than or equal to the second threshold, the sensor management unit 440 may determine that there is a margin of power in each operating sensor node. On the other hand, when the operating sensor node whose remaining power amount is less than the second threshold is identified, the sensor management unit 440 may determine that there is no margin in the power of the corresponding operating sensor node.

The second threshold may be set to a value that a person of ordinary skill in the art considers to be appropriate for determining whether the operating sensor node has a margin of power. In determining whether the operating sensor node has a margin of power, a power usage required for the below operation of changing the operating sensor node may be considered together. For example, the sensor management unit 440 may determine whether the remaining power amount of each operating sensor node is sufficient to perform the sensing operation as a sensor node, the communication operation with the cluster head, and the subsequent operation sensor node change operation (S710).

When an operating sensor node with no margin of power is identified in the step S710, the sensor management unit 440 may perform an operation for changing the operating sensor node to another communication node.

In order to change the operating sensor node, the sensor management unit 440 may identify statuses of standby sensor nodes of the same sensor group as the operating sensor node to be changed.

In identifying the statuses of these standby sensor nodes, it can be checked whether there is a margin of power. That is, the sensor management unit 440 may select an operating sensor having a margin of power from among the standby sensor nodes of the same sensor group as the operating sensor node to be changed. In addition, in identifying the statuses of the standby sensor nodes, distances to the cluster head may be checked. That is, the sensor management unit 440 may check a standby sensor node closest to the cluster head among the standby sensor nodes of the same sensor group as the operating sensor node to be changed (S720).

The sensor management unit 440 may select a standby sensor node which has a margin of power and is closest to the cluster head from among the standby sensor nodes of the same sensor group such as the operating sensor node to be changed (S720). The sensor management unit 440 may change the selected standby sensor node to an operating sensor node, and change the existing operating sensor node to a standby sensor node (S730).

When an operating sensor node with no margin of power is not identified in the step S710, the sensor management unit 440 may confirm whether the cluster head has been changed during the sensing operation (S740). This confirmation may be performed based on information provided from the head management unit 450.

As described in the step S555 of FIG. 5 and the step S720 of FIG. 7, in an exemplary embodiment of the present disclosure, the operating sensor nodes and the standby sensor nodes may be selected according to the distances to the cluster head. However, as shown in FIG. 6, in an exemplary embodiment of the present disclosure, the cluster head may be changed according to whether the cluster head has a power margin. When the cluster head is changed in this manner, the distances between the cluster head and other communication nodes may also be changed. Therefore, when the cluster head is changed, it may also be necessary to change the operating sensor nodes.

When it is confirmed that the cluster head has been changed in the step S740, the sensor management unit 440 may perform an operating sensor node change operation based on the distances to the changed cluster head. That is, the sensor management unit 440 may select one by one among the communication nodes included in the sensor candidate group of each sensor group, which has sufficient power and has the closest distance to the changed cluster head (S720). The sensor management unit 440 may maintain the existing operating sensor node if the selected communication node is the same as the existing operating sensor node. On the other hand, if the selected communication node is different from the existing operating sensor node, the sensor management unit 440 may change the selected communication node to an operating sensor node and change the existing operating sensor node to a standby sensor node (S730).

If the change of the cluster head is not confirmed in the step S740, the sensor management unit 440 may perform the steps S700 and S710 again.

As described above, the cluster configuration apparatus according to an exemplary embodiment of the present disclosure can monitor the power margin of each operating sensor node currently performing sensing, and when an operating sensor node having no power margin is identified, it can change the identified operating sensor node to another standby sensor node of the same senor group as the identified operating sensor node. Through this, the stability of the sensor management operation can be improved and the lifetime of the entire cluster can be improved.

In addition, the cluster configuration apparatus according to an exemplary embodiment of the present disclosure can increase the stability of the operating sensor node change operation and the overall sensor management operation by taking into account the power usage required for the operating sensor node change operation in determining whether there is such a power margin.

In addition, the cluster configuration apparatus according to an exemplary embodiment of the present disclosure can manage the sensing operation so that communication nodes close to the cluster head perform the sensing operation by checking whether the cluster head is changed in the sensor management operation. Through this, it is possible to reduce waste of communication resources and power and increase the efficiency of the communication system.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for configuring a cluster, performed by a cluster configuration apparatus in a communication system, the method comprising:
   selecting cluster members from among a plurality of communication nodes;
   identifying radio signal strength deviations between the cluster members;
   generating sensor groups by classifying the cluster members according to sensor types;
   selecting a head candidate group and a sensor candidate group of each of the sensor groups based on the radio signal strength deviations;
   selecting a cluster head in the head candidate group;
   selecting operating sensor nodes in the sensor candidate group; and
   configuring one among the operating sensor nodes as a virtual device,
   wherein the virtual device operates to transmit information obtained from the operating sensor nodes to the cluster head.

2. The method according to claim 1, wherein in the selecting of the cluster head, one cluster member in a head candidate group of a sensor group having a largest number of cluster members among the sensor groups is selected as the cluster head.

3. The method according to claim 2, wherein in the selecting of the cluster head, a cluster member having a smallest radio signal strength deviation in the head candidate group of the sensor group having the largest number of cluster members among the sensor groups is selected as the cluster head.

4. The method according to claim 1, wherein in the selecting of the head candidate group and the sensor candidate group of each of the sensor groups, a number of cluster members of a sensor group having a fewest cluster members among the sensor groups is set as a first reference number, cluster members as many as the first reference number in an order of a large radio signal strength deviation are selected as the sensor candidate group for each sensor group, and other cluster members are selected as the head candidate group for each sensor group.

5. The method according to claim 1, wherein in the selecting of the operating sensor nodes in the sensor candidate group, a cluster member having a closest distance to the cluster head among cluster members of the sensor candidate group of each of the sensor groups is selected as an operating sensor node, and other cluster members are selected as standby sensor nodes.

6. The method according to claim 1, further comprising:
   identifying a remaining power amount of the cluster head; and
   when the remaining power amount of the cluster head is less than a first threshold, changing one cluster member in a head candidate group of a sensor group having a lowest power usage rate among the sensor groups to the cluster head.

7. The method according to claim 6, wherein in the changing of one cluster member to the cluster head, a cluster member having a smallest radio signal strength deviation in the head candidate group of the sensor group having the lowest power usage rate is changed to the cluster head.

8. The method according to claim 1, further comprising:
identifying remaining power amounts of the operating sensor nodes; and
when an operating sensor node having a remaining power amount less than a second threshold is identified, a standby sensor node closest to the cluster head in a sensor candidate group of a sensor group to which the operating sensor node having the remaining power amount less than the second threshold belongs is changed to the operating sensor node.

9. The method according to claim 1, further comprising, when the cluster head is changed, changing cluster members closest to the changed cluster head within the sensor candidate group of each of the sensor groups to the operating sensor nodes.

10. A cluster configuration apparatus for configuring a cluster in a communication system, the cluster configuration apparatus comprising:
a processor; and
a memory storing at least one instruction executable by the processor,
wherein when executed by the processor, the at least one instruction causes the processor to:
select cluster members from among a plurality of communication nodes;
identify radio signal strength deviations between the cluster members;
generate sensor groups by classifying the cluster members according to sensor types;
select a head candidate group and a sensor candidate group of each of the sensor groups based on the radio signal strength deviations;
select a cluster head in the head candidate group;
select operating sensor nodes in the sensor candidate group; and
configure one among the operating sensor nodes as a virtual device,
wherein the virtual device operates to transmit information obtained from the operating sensor nodes to the cluster head.

11. The cluster configuration apparatus according to claim 10, wherein the at least one instruction further causes the processor to select a cluster member having a smallest radio signal strength deviation in a head candidate group of a sensor group having a largest number of cluster members among the sensor groups as the cluster head.

12. The cluster configuration apparatus according to claim 10, wherein the at least one instruction further causes the processor to set a number of cluster members of a sensor group having a fewest cluster members among the sensor groups as a first reference number, select cluster members as many as the first reference number in an order of a large radio signal strength deviation as the sensor candidate group for each sensor group, and select other cluster members as the head candidate group for each sensor group.

13. The cluster configuration apparatus according to claim 10, wherein the at least one instruction further causes the processor to select a cluster member having a closest distance to the cluster head among cluster members of the sensor candidate group of each of the sensor groups as an operating sensor node, and select other cluster members as standby sensor nodes.

14. The cluster configuration apparatus according to claim 10, wherein the at least one instruction further causes the processor to identify a remaining power amount of the cluster head; and change one cluster member in a head candidate group of a sensor group having a lowest power usage rate among the sensor groups to the cluster head, when the remaining power amount of the cluster head is less than a first threshold.

15. The cluster configuration apparatus according to claim 10, wherein the at least one instruction further causes the processor to identify remaining power amounts of the operating sensor nodes; and change a standby sensor node closest to the cluster head in a sensor candidate group of a sensor group to which an operating sensor node having a remaining power amount less than a second threshold belongs to the operating sensor node, when the operating sensor node having the remaining power amount less than the second threshold is identified.

16. The cluster configuration apparatus according to claim 10, wherein the at least one instruction further causes the processor to, when the cluster head is changed, change cluster members closest to the changed cluster head within the sensor candidate group of each of the sensor groups to the operating sensor nodes.

* * * * *